(12) United States Patent
Nagashima et al.

(10) Patent No.: US 6,376,086 B1
(45) Date of Patent: Apr. 23, 2002

(54) NONLINEAR OPTICAL SILICA MATERIAL AND NONLINEAR OPTICAL DEVICE

(75) Inventors: Tomonori Nagashima, Susono; Naoki Nakamura, Shizuoka-ken, both of (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 09/362,547

(22) Filed: Jul. 28, 1999

(30) Foreign Application Priority Data

Jul. 30, 1998 (JP) .......................................... 10-215453

(51) Int. Cl.$^7$ ............................. B32B 9/00; C01B 33/00
(52) U.S. Cl. ...................... 428/446; 428/448; 428/450; 428/469; 428/697; 501/154; 423/335
(58) Field of Search ...................... 438/778; 428/446, 428/448, 450, 469, 697; 501/154, 42; 423/335

(56) References Cited

U.S. PATENT DOCUMENTS

| | | | | |
|---|---|---|---|---|
| 5,673,354 A | * | 9/1997 | Akasaka et al. ............ | 285/127 |
| 5,783,498 A | * | 7/1998 | Dotta ......................... | 438/778 |
| 5,885,881 A | * | 3/1999 | Ojha ........................... | 438/381 |
| 6,185,033 B1 | * | 2/2001 | Bose et al. ................. | 359/254 |

FOREIGN PATENT DOCUMENTS

| | | |
|---|---|---|
| EP | 0617301 A1 * | 8/1998 |
| JP | 62-276510 | 12/1987 |
| JP | 1-201045 | 8/1989 |
| JP | 6-340444 | 12/1994 |
| JP | 10-090546 | 4/1998 |
| JP | 10-111526 | 4/1998 |
| JP | 10-161164 | 6/1998 |
| WO | WO98/12592 | 3/1998 |

OTHER PUBLICATIONS

Borelli, N. F., et al., "Resonant and non-resonant effects in photonic glasses", *J. Non–Crystalline Solids*,185:109–122 (1995) No Month.

Atkins, R. M., et al., "Mechanisms of Enhanced UV Photosensitive via Hydrogen Loading in Germanosilicate Glasses", *Electronics Letters*, vol. 29, No. 14, pp. 1234–1235 (Jul. 8, 1993).

Fujiwara, T., et al., "Second–harmonic generation in germanosilicate glass poled with ArF laser irradiation," *Appl. Phys. Lett.*:71(8) (Aug. 25, 1997).

* cited by examiner

Primary Examiner—Deborah Jones
Assistant Examiner—Stephen Stein
(74) Attorney, Agent, or Firm—Finnegan, Henderson, Farabow, Garrett & Dunner, L.L.P.

(57) ABSTRACT

A nonlinear optical silica material mainly consisting of $SiO_2$—$GeO_2$ to which hydrogen or halogen element X is added. Oxygen bonded to Ge contained in the nonlinear optical silica material is replaced by H or X, and one Ge has two Ge—O bonds and one Ge—H (or Ge—X) bond at Ge· points where nonlinearity is exhibited in the silica material. The Ge—H (or Ge—X) bond does not relate to a crystal network, so that when the polarity is oriented in order to exhibit nonlinearity at Ge·, an electric field to be applied can be lowered, and when a optical semiconductor hybrid element or the like is produced, other portions of the semiconductor elements can be prevented from being broken or degraded in performance. An insulating film can be interposed between the semiconductor substrate and the nonlinear optical silica film to prevent undesired impurities from dispersing into the semiconductor substrate and other elements and preventing a defect from being caused in the crystal of the substrate due to the silica film.

7 Claims, 7 Drawing Sheets

NONLINEAR OPTICAL SILICA MATERIAL AND NONLINEAR OPTICAL DEVICE

BACKGROUND OF THE INVENTION

1. Field of the Invention

The present invention relates to a nonlinear optical silica material based on $SiO_2$—$GeO_2$, and more particularly to a nonlinear optical silica material having nonlinear optical properties which are exhibited readily, and which is very reliable. The invention also relates to an optical functional device using the nonlinear optical silica material and a method of producing it.

2. Description of the Related Art

It is almost inevitable that the field of optical communications will be the subject of major development in the future. A light-controlled switching device, a wavelength conversion device, an optical functional device such as an optical memory and an optical sensor are major components in an optical communication system. An optical material having nonlinear properties is also important to produce such optical functional devices.

As a nonlinear optical material, a crystalline material such as $LiNbO_3$ (lithium niobate) has been put to practical use.

However, when this nonlinear optical material $LiNbO_3$ is used as an optical device, its physical properties are very different from those of glass (e.g., optical glass fiber) used as a connecting member, and this difference in physical properties has a problem of causing a defect in the optical device. Also, $LiNbO_3$ is bulky and quite difficult to make thin film. Such a bulky optical functional part and a semiconductor device must be produced separately and then combined together, resulting in a disadvantage in view of production costs. Besides, it is difficult to form the bulky nonlinear optical device minutely, so that it can not easily be made highly functional.

Figure 1:
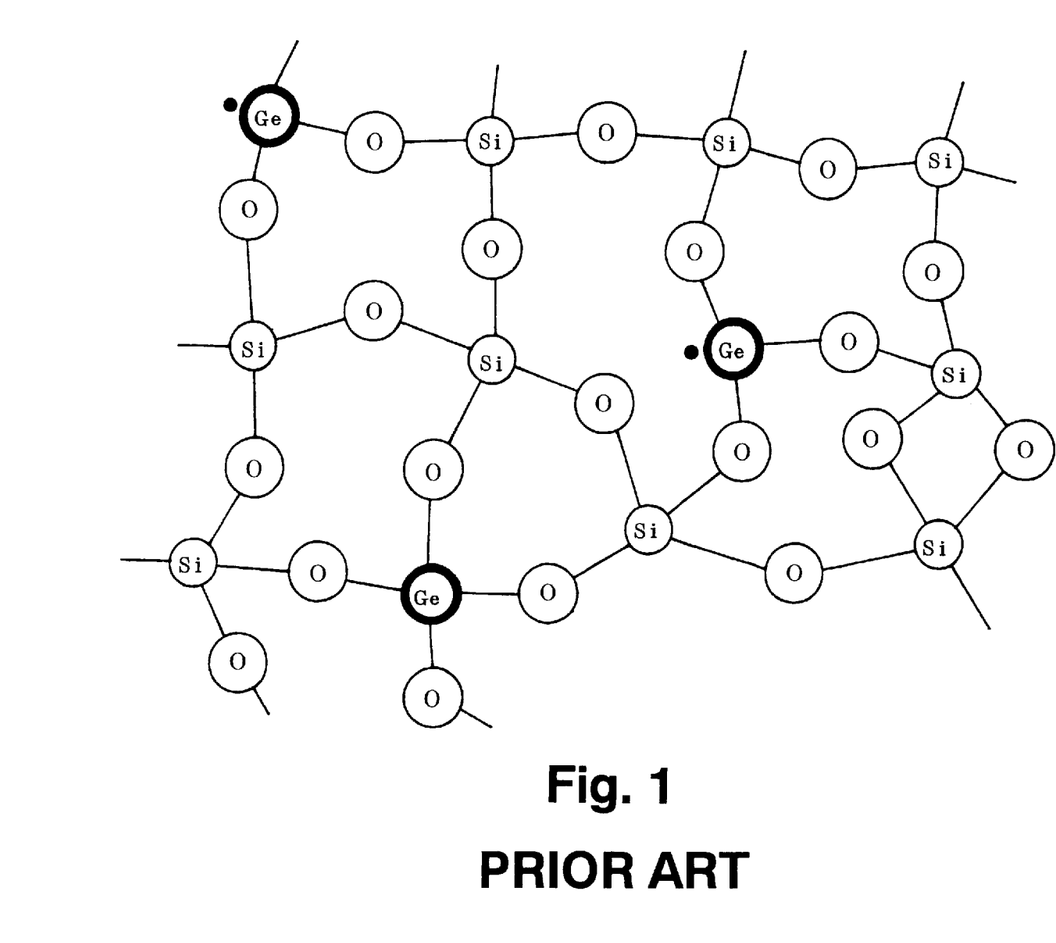
FIG. 1 is a schematic diagram showing a crystal structure of a conventional $SiO_2$—$GeO_2$ nonlinear optical silica material.

Under such circumstances, $SiO_2$—$GeO_2$ glass is now under development as a nonlinear material which can be formed into a thin film and is based on silicon glass having only slight differences in physical properties from silica glass or the like. FIG. 1 is a schematic diagram showing a three-dimensionally configured bonded state of the $SiO_2$—$GeO_2$ glass in a two-dimensional form. This $SiO_2$—$GeO_2$ has less optical loss, a wider transmitted wavelength area and better processability and durability compared with a conventional material. Also, $SiO_2$—$GeO_2$ material is considered to be readily formable into a thin film, and if the nonlinear optical material, $SiO_2$—$GeO_2$, can be formed into a thin film, it can be readily made into a hybrid with a semiconductor (electric) device such as an IC and LSI. It is well known that ICs and LSIs are produced by performing heat treatment and thin film formation while finely processing the surface of a substrate of Si, GaAs or the like. Therefore, a process of forming the nonlinear optical material can be incorporated into the process of manufacturing an IC or LSI using the $SiO_2$—$GeO_2$ material formed into a thin film, so that a optical semiconductor hybrid element can be produced. In addition, development into a high-integrated optical device (optical IC) is also high. $SiO_2$—$GeO_2$ has a material composition similar to those of a main semiconductor material Si and an oxide film ($SiO_2$) which is formed when Si is processed and also has good applicability to a semiconductor production process compared with a conventional nonlinear optical material.

However, this proposed $SiO_2$—$GeO_2$ film which can be made thin is still in a research stage and satisfactory nonlinear optical properties have not been obtained yet. Neither are its element composition and manufacturing method optimized, and so it has not been put to practical use. In order to impart nonlinear optical properties to this $SiO_2$—$GeO_2$ film, its poling must be performed by applying a high electric field of about $10^5$V/cm. However, a high electric field causes breakage of the semiconductor element or degradation in performance when a hybrid element is configured by incorporating an IC, LSI or the like having other circuit elements (transistors, capacitors and the like) on a semiconductor substrate such as Si which is also used for the nonlinear optical material film. There is therefore a demand for satisfactory nonlinear optical properties to be obtainable by applying a low electric field so that an adverse effect owing to the application of the electric field to the $SiO_2$—$GeO_2$ film is not applied to other semiconductor elements.

When the $SiO_2$—$GeO_2$ film is formed on a semiconductor substrate of Si or the like, elements such as Ge of the $SiO_2$—$GeO_2$ film are dispersed in the semiconductor substrate (Si), causing a breakage in the semiconductor substrate and also the transistors, capacitors and other elements formed on the semiconductor substrate or degradation in performance thereof. Furthermore, there is likely to be a problem that when the $SiO_2$—$GeO_2$ film is formed on the semiconductor substrate, a defect in the crystal of the surface of the semiconductor substrate is increased.

SUMMARY OF THE INVENTION

It is an object of the present invention to provide a material which can exhibit satisfactory high nonlinear optical properties by applying a weak electric field which does not affect other elements even when an $SiO_2$—$GeO_2$ film having physical properties somewhat different from silica glass is used as an optical material.

It is another object of the invention to lower an adverse effect on the other elements caused by the presence of a nonlinear optical silica film mainly consisting of $SiO_2$—$GeO_2$ formed on a substrate such as an Si substrate which has other semiconductor elements formed thereon.

The present invention has been achieved to complete the aforesaid objects and has the following features.

First, the nonlinear optical silica material of the invention has $Sio_2$—$GeO_2$ as a main component and is characterized by having a hydrogen or halogen element added to this silica material.

The invention is also characterized in that oxygen, which is bonded to Ge contained in the nonlinear optical silica material mainly consisting of $SiO_2$—$GeO_2$, is substituted by hydrogen.

The invention is also characterized in that oxygen bonded to Ge contained in the material is substituted by elemental halogen to totally or partly take the place of hydrogen.

In the nonlinear optical material mainly consisting of $SiO_2$—$GeO_2$, Si and Ge elements having four coordinates are bonded through O elements to form Si—O—Si, Si—O—Ge and Ge—O—Ge bonds. Among them, a part where the material exhibits nonlinearity is a part where all valence arms of Ge elements having four coordinates of the Ge—O bond do not bond with O elements but some valence arms have remained as nonvalence arms, namely a so-called dangling bond (unpaired electron) is present.

Figure 2:
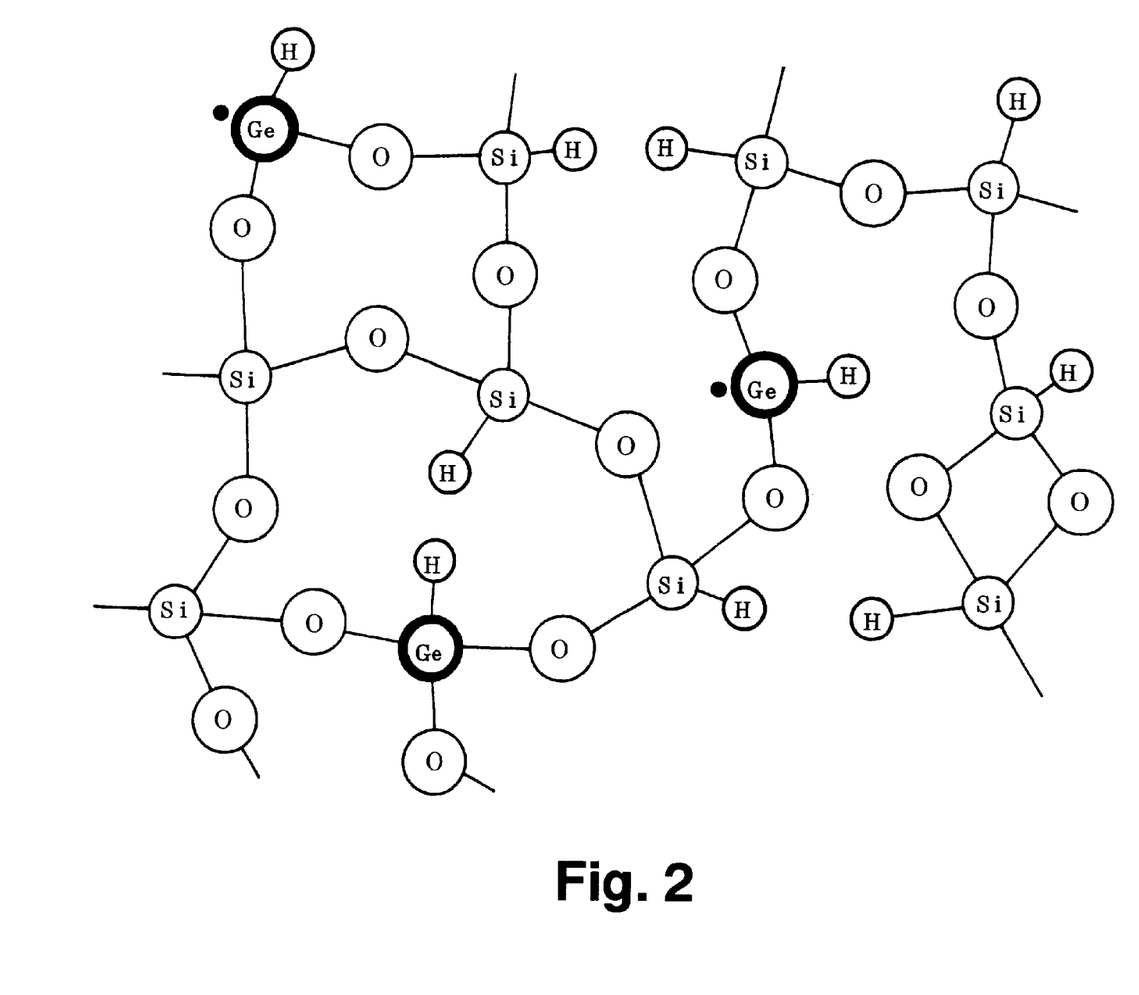
FIG. 2 is a schematic diagram showing a crystal structure of $SiO_2$—$GeO_2$ nonlinear optical silica material with H added according to the present invention.

The nonlinear optical silica material according to the present invention has, for example, a structure indicated in a two-dimensional form as shown in FIG. 2. It is seen in FIG. 2 that H (hydrogen) is added to the material so to have Si—H and Ge—H bonds (Si—X and Ge—X bonds when halogen element X is added) in the material film. In the bonded state of points (Ge·) where nonlinearity is exhibited, the material of the present invention (see FIG. 2) has two Ge—O bonds and one Ge—H (Ge—X when halogen element X is added) bond with respect to one Ge while a conventional material (see FIG. 1) has three Ge—O bonds.

Thus, Ge—H bonds and Ge—X bonds which do not relate to bonding of crystal networks can be formed at points (Ge·)where nonlinearity is exhibited by adding hydrogen and halogen elements to the nonlinear optical silica material. In other words, since the Ge· points have a bond not related to the crystal network, the electric field applied can be lowered substantially compared with a conventional nonlinear optical silica material in processing for polarity orientation (poling) to cause the nonlinear optical silica material to exhibit nonlinearity.

As described above, the nonlinear optical silica material according to the present invention can be used as a thin film on a semiconductor substrate so to form, for example, a optical semiconductor hybrid element having a silicon semiconductor element on the same silicon substrate. When such a hybrid element is produced, the semiconductor element is prevented from being broken or degraded in performance by an electric field applied for orientation of the polarity of the nonlinear optical silica material. Therefore, fine processing and formation of a multifunctional element can be performed simultaneously by forming the nonlinear optical silica material of the invention into a thin film and incorporating it into a semiconductor element, and the functions of the optical device can be improved remarkably, and significant reduction in costs can be made.

Thus, by adding hydrogen and halogen, flexibility of arrangement of the elements in the material can be enhanced, stress applied to the film is decreased, and the separation of the film from the substrate can be prevented. Therefore, a defective rate in forming the optical semiconductor hybrid element by combining the nonlinear optical film and the semiconductor element can be lowered. The reliability of the element can also be improved in view of the above-described points.

Furthermore, a defect inherent in the material is decreased by virtue of hydrogen and halogen, and reliability and stability are also improved.

In this invention, H or halogen element X is suitably added in an amount to fully exhibit an effect of its addition without disturbing the basic $SiO_2$—$GeO_2$ bond. A composition ratio of the Si and Ge elements is at a level to fully secure a necessary optical transmission factor required as the optical material and to fully exhibit a nonlinear effect by Ge·. Oxygen is desired to be contained in an amount necessary to obtain Si—O—Si, Si—O—Ge and Ge—O—Ge bonds.

The nonlinear optical device according to the invention is characterized in that the aforesaid hydrogen and halogen are contained in the nonlinear optical silica material, or the nonlinear optical silica material having oxygen bonded to Ge substituted by hydrogen and halogen is formed on a desired substrate, and an insulating thin film is intervened between the nonlinear optical silica material and the substrate.

Such an insulating thin film, which is interposed between the nonlinear optical silica film and a desired substrate, has functions to prevent a defect from increasing on the surface of the substrate and the Ge elements from dispersing into the semiconductor substrate when the silica film is formed on the surface of the substrate.

Therefore, dispersion of undesired impurities into the semiconductor substrate and other elements such as transistors and capacitors which are important as the semiconductor elements or occurrence of a defect in the substrate can be prevented, and a functional element excelling in reliability can be produced.

The insulating film can be made of a silicon compound such as silicon oxide (SiOx) or silicon nitride (SiNx). The insulating film has a thickness of 0.1 to 10000 nm, and more preferably 2 to 1000 nm.

DESCRIPTION OF THE PREFERRED EMBODIMENTS

Preferred embodiments of the invention will be described with reference to the accompanying drawings. [Aspect 1]

FIG. 2 is a schematic diagram two-dimensionally showing a bonded state of the nonlinear optical silica material which is configured three-dimensionally according to aspect 1 of the invention. Si and Ge elements having four coordinates form Si—O—Si, Si—O—Ge and Ge—O—Ge bonds by bonding via the O elements. Si—Si Si—Ge and Ge—Ge bonds are also partly present. A portion exhibiting nonlinearity is a point where all valence arms of the Ge elements having four coordinates do not bond to the O elements at the Ge—O bonded point and a dangling bond (unpaired electron) exists. Such a portion is indicated as Ge· in the drawing.

According to the invention, H is added and Si—H and Ge—H bonds are present in the nonlinear optical silica material of the invention compared with the crystal structure (FIG. 1) of a conventional nonlinear optical silica material. At the points (Ge·) to exhibit the nonlinearity, three Ge—O bonds are present in the conventional material (see FIG. 1), while two Ge—O bonds and one Ge—H bond are present in the nonlinear optical silica material of the aspect 1 of the invention as shown in FIG. 2.

After forming a nonlinear optical material film having the aforesaid crystal structure, an electric field is applied to the nonlinear optical material to direct the electrical polarity of Ge· points in the same direction (polarity orientation) so as to actually exhibit the nonlinearity.

In poling, the aspect 1 can orient the polarity of Ge· easily and lower a necessary electric field because the Ge· points to exhibit the nonlinearity in the nonlinear optical silica material have Ge—H bonds and the like which do not relate to bonding of a network. Specifically, the conventional silica material to be described afterward needs an electric field strength of about $10^5$ V/cm or more, while the material of the aspect 1 can be subjected to poling with an electric field strength of $10^3$ V/cm to $10^4$ V/cm which are lower by about one digit.

The elements of the nonlinear optical silica material are Si and O as the elements mainly configuring the bonds, Ge which configures the bonds and has dangling bonds, and H as an added element. They are in a ratio of 15 to 40% of Si, 0.01 to 20% of Ge, 20 to 70% of O and 1 ppm to 50% of H in view of the number of elements. Preferably, they are 20 to 35% of Si, 2 to 10% of Ge, 35 to 64% of O and 2 to 40% of H. The nonlinear optical silica material typically consists of 27.7% of Si, 5.6% of Ge, 56.7% of O and 10.0% of H.

H is added in a ratio to fully provide the effect of addition without disturbing the $SiO_2$—$GeO_2$ bond configuring the basic skeleton. Si and Ge elements are also added in a ratio to fully secure a necessary optical transmission factor as the optical material and to fully exhibit the non linear effects by Ge·. Oxygen is preferably contained in an amount to configure the Si—O—Si, Si—O—Ge and Ge—O—Ge bonds and desirably in a ratio of the number of elements of (Si+Ge):{O×2+H}≈1:4 as a stoichiometrical composition ratio.

Now, an example of forming the nonlinear optical silica film according to the aspect 1 will be described. For example, when the nonlinear optical silica film of the aspect 1 is formed on a semiconductor substrate, it can be formed readily by using a vapor phase synthesis method, e.g., a plasma CVD method, as a typical method.

Figure 3:
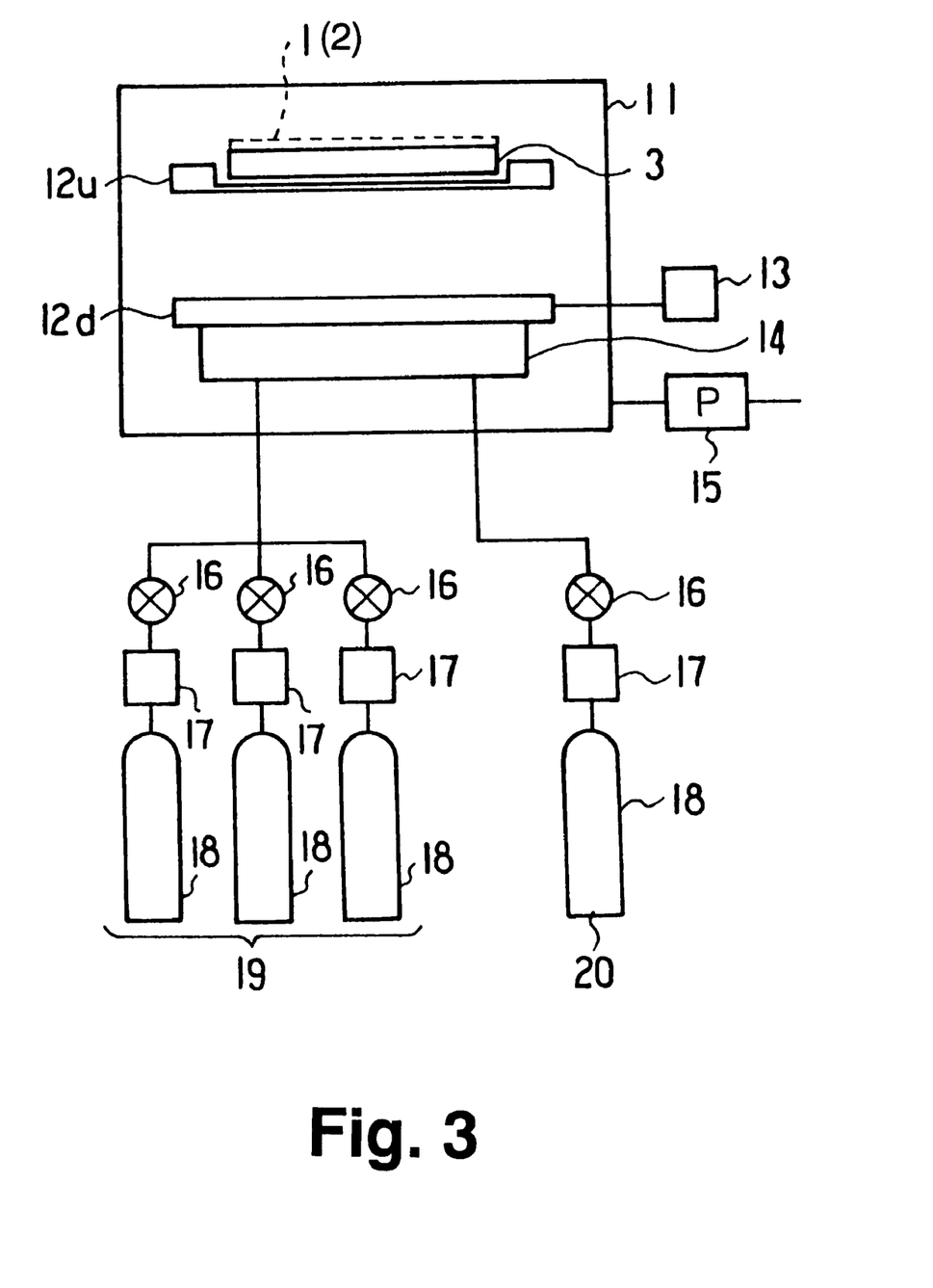
FIG. 3 is a schematic diagram showing a structure of a CVD apparatus for forming a nonlinear optical silica film or insulating film on a semiconductor substrate.

FIG. 3 is a schematic diagram showing a plasma CVD apparatus. FIG. 3 shows that upper and lower discharge electrodes, 12$u$, 12$d$ are disposed within a decompression container 11 into which raw materials are introduced. A semiconductor substrate 3, on which the nonlinear optical silica film according to the aspect 1 is formed, is mounted on the upper discharge electrode 12$u$, and a high-frequency power source 13 and a gas mixing section 14 are connected to the lower discharge electrode 12$d$, The semiconductor substrate 3 can be heated to 50 to 500° C. depending on a structure of a target nonlinear optical silica film. An outlet of the decompression container 11 is connected to a pump to extract air from the container A substance containing at least Si and H or a substance containing at least Si and Ge is introduced into the sealed container 11 with a flow rate of $H_2$ and $O_2$ gases adjusted. Subsequently, power is supplied from the high-frequency power source 13 while maintaining a gas pressure at about 1 to 1000 Pa to produce plasma for a predetermined period so as to decompose the gases for a predetermined period, thereby forming the nonlinear optical silica film 1 on the surface of the semiconductor substrate 3.

Material gases are supplied from raw material containers 18 to the gas mixing section 14 through flow rate regulators 17 and valves 16. The raw material containers 18 are connected to the gas mixing section 14 through different pipes so as to separately supply combustible gases 19 and a combustion-supporting gas 20. This is designed to mix the combustible gases (e.g., $H_2$, $SiH_4$, $GeH_4$) and the combustion-supporting gas (e.g., $O_2$) for the first time in the fully decompressed gas mixing section and to prevent the combustible gases from burning in piping to the gas mixing section 14.

As described above, by the selection of a material gas and the adjustment of a mixing ratio of the material gases, a temperature of a semiconductor substrate and a pressure in the decompression container according to the vapor phase synthesis method (plasma CVD method), the nonlinear optical silica film 1 mainly consisting of $SiO_2$—$GeO_2$ having the bonds of Si—H, Ge—H and the like as shown in FIG. 2 can be formed.

Figure 4:
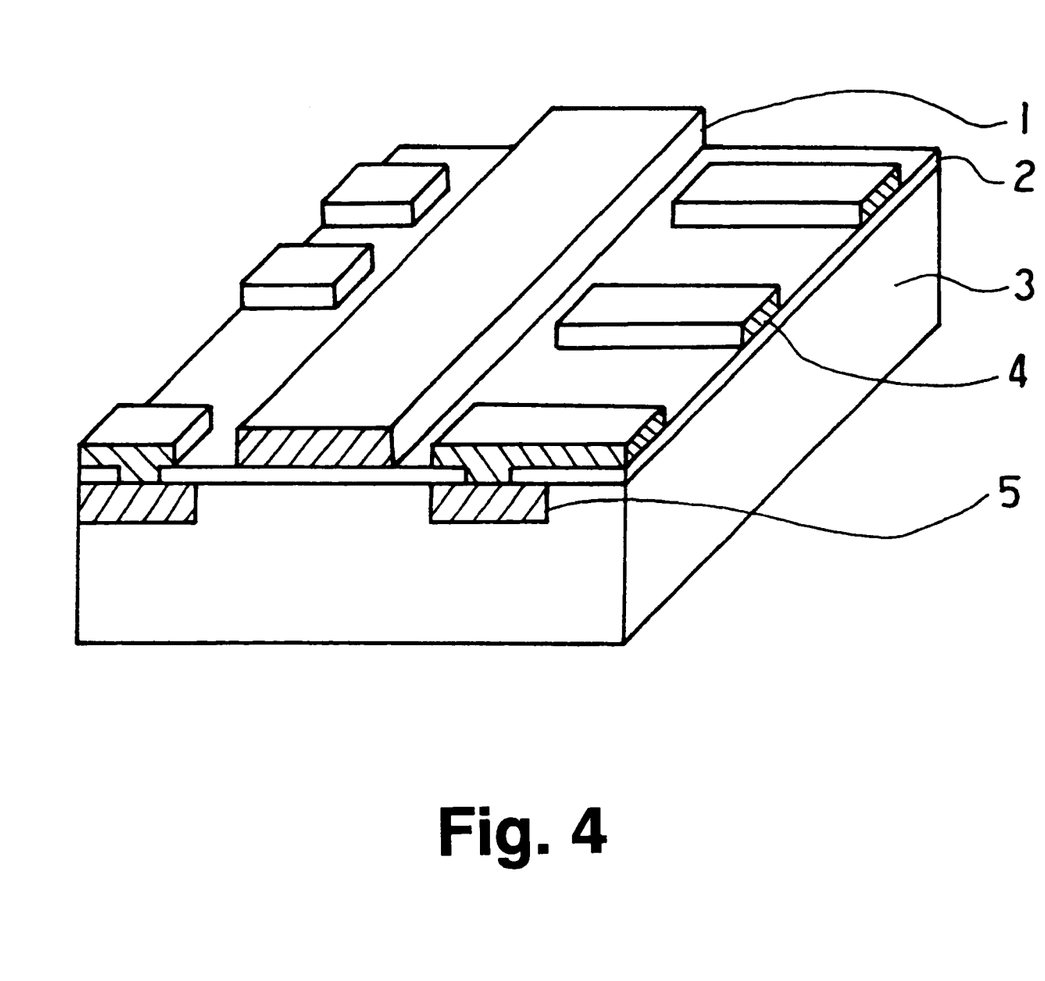
FIG. 4 is a diagram showing an example structure of an optical device having an $SiO_2$—$GeO_2$ nonlinear optical silica film according to the invention.

FIG. 4 shows an example structure of the nonlinear optical silica film 1 according to this aspect 1 formed on the semiconductor substrate 3. The nonlinear optical silica film 1 mainly consists of $SiO_2$—$GeO_2$ with H added as described above. Semiconductor elements (transistors, capacitors, etc.) consisting of wiring 4 and a semiconductor layer 5 are also formed in addition to the silica film 1 on the semiconductor substrate 3.

As described above, the nonlinear optical silica film 1 of the aspect 1 has the Ge—H bonds, so that Ge is present as a non-valence arm dangling bond at the Ge—H bonds. The Ge· points have an electron loss and carry a positive charge. Non-linearity can be exhibited by unifying and orienting (poling: polarization) the charge-localized points in one direction by using an external electric field. To orient the Ge· points, an electric field is applied by bringing the nonlinear optical silica film 1 and the semiconductor substrate 3 into contact with the electrode.

Figure 5:
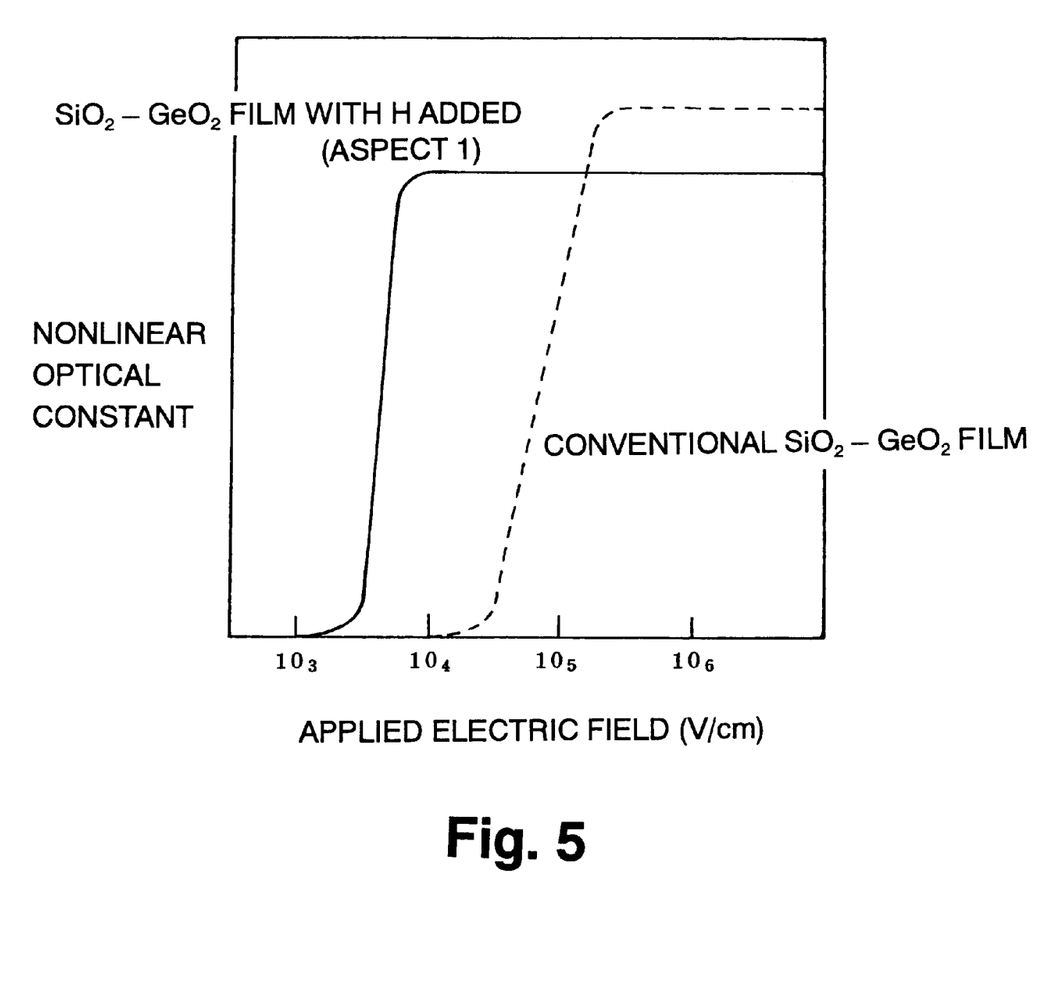
FIG. 5 is a diagram showing an effect of adding H to the $SiO_2$—$GeO_2$ nonlinear optical silica material.

A nonlinearity strength (nonlinear optical constant) depending on an applied electric field strength is shown in FIG. 5. For comparison, the measured results of the nonlinear optical silica film containing H according to the aspect 1 (see FIG. 2) and a conventional nonlinear optical silica film (see FIG. 1) are shown in FIG. 5. In the aspect 1 of the invention, by containing H in the silica film mainly consisting of $SiO_2$—$GeO_2$, a strength of the electric field applied for exhibiting the nonlinearity is significantly lower than, for example, $10^4$ V/cm in FIG. 5, compared with the conventional case ($10^5$ V/cm). It is apparent that the applied electric field is lowered by an order of magnitude or more. An rate of increase of the nonlinear optical constant with respect to the increase of the applied electric field is indicated by a very steep inclination for the film of aspect 1, indicating that it is improved compared with the conventional film.

By configuring according to the aspect 1 as described above, the applied electric field for orientation of the polarity of Ge· can be lowered, and the electric field strength applied to the semiconductor substrate 3 and the semiconductor element formed on the semiconductor layer 5 shown in FIG. 4 is lowered with the decrease of the applied electric field strength. Therefore, when the optical semiconductor hybrid element as shown in FIG. 4 is produced, the semiconductor element can be prevented from being broken or degraded in performance by the electric field applied for poling the silica film 1.

Fine processing and formation of a multifunctional element can be carried out simultaneously and the functions of an optical device can be improved remarkably because the nonlinear optical material can be formed into a film and incorporated in the semiconductor element as shown in FIG. 4, and significant reduction in costs becomes possible.

EXAMPLE 1

A specific example of forming the nonlinear optical silica film by the plasma CVD apparatus shown in FIG. 3 according to the aspect 1 will be described.

First, the semiconductor substrate 3 having a predetermined semiconductor layer previously formed thereon is mounted on the upper electrode 12u placed in the decompression container 11. The upper electrode 12u is connected to ground, and the lower electrode 12d is connected to the high-frequency power source 13.

Then, the sealed container 11 is decompressed to about $10^{-3}$ to $10^{-4}$ Pa by the pump 15, and the semiconductor substrate 3 is heated to about 50 to 500° C. as required by a heater built into the upper electrode 12u or the like.

Subsequently, $SiH_4$ gas diluted with $H_2$ or an inert gas as required, $GeH_4$ gas diluted with $H_2$ or an inert gas as required and $H_2$ gas are introduced from cylinders filled with the combustible gases 19 into the decompression container 11 through the flow rate adjusters 17 and the valves 16. Meanwhile, $O_2$ gas is supplied into the decompression container 11 from the cylinder filled with $O_2$ gas which is the combustion-supporting gas 20 through the flow rate adjuster 17 and the valve 16. $O_2$ gas which is the combustion-supporting gas as described above is mixed with the combustible gas in the gas mixing section 14 within the fully decompressed container 11 to prevent it from being burned in the piping.

The pressure in the container 11 is maintained at about 10 to 100 Pa by an adjuster, and power with a frequency of 13.56 MHz is applied from the power source 13 to generate plasma for a predetermined period so as to decompose the material gases such as $SiH_4$, $GeH_4$, $H_2$ and $O_2$ supplied from the cylinders 19, 20. Thus, the nonlinear optical silica film 1 having a thickness of 0.1 to 10 $\mu$m is formed on the surface of the semiconductor substrate 3.

Means for decomposing the material gases in Example 1 is a high-frequency power source of 13.56 MHz. However, this frequency is not exclusive but can be in a range of 1 KHz to 10 GHz. Besides, it is not limited to a high frequency. A DC electric discharge, optical energy such as ultraviolet rays, a chemical reaction, a high temperature (heat) or the like can also be used to decompose the material gases.

[Aspect 2]

Hydrogen was added to the nonlinear optical silica material mainly consisting of $SiO_2$—$GeO_2$ in the aspect 1 described above. However, this aspect 2 adds halogen element X instead of a part or all of hydrogen to the nonlinear optical silica material.

Figure 6:
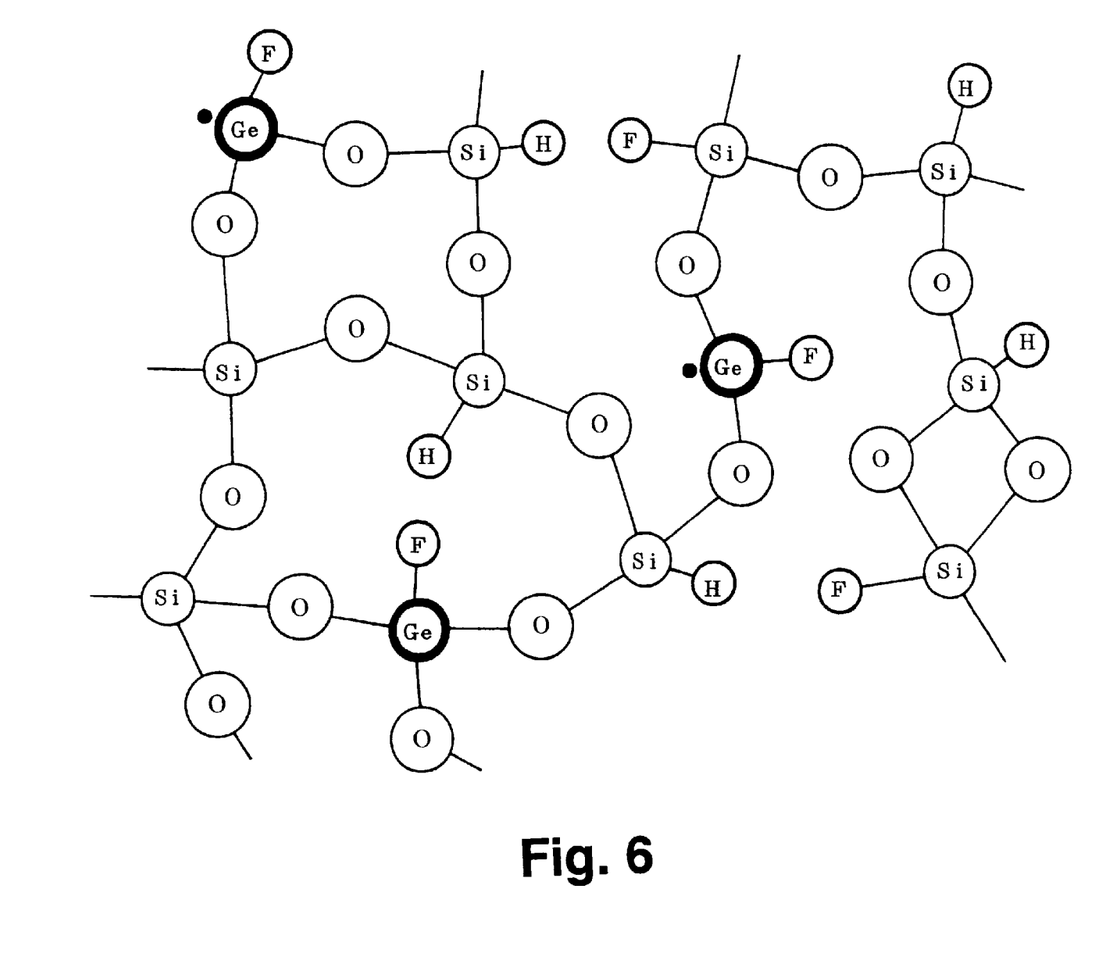
FIG. 6 is a schematic diagram showing a crystal structure of $SiO_2$—$GeO_2$ nonlinear optical silica material having elemental halogen added according to the invention.

FIG. 6 is a schematic diagram two-dimensionally showing a three-dimensionally configured bond state of the nonlinear optical silica material according to the aspect 2. In FIG. 6, a part or all of H of FIG. 2 is replaced by halogen element X, namely fluorine F in this aspect to form bonds of Si—F, Ge—F and the like in the crystal. Two Ge—O bonds and one Ge—F bond are present at points (Ge·) where the nonlinearity is exhibited in the nonlinear optical silica material.

In the same way as in the aspect 1, after forming the nonlinear optical silica material having the crystal structure as shown in FIG. 6, poling is performed by applying an electric field to the material in order to exhibit the nonlinearity in the material. However, the electric field required for poling can be lowered in the same way as in the aspect 1 because the Ge—F bond which does not relate to the crystal network is present at the Ge· points.

Therefore, even when the halogen element such as F is added instead of H, the semiconductor element portion can be prevented from being broken or degraded in performance due to the application of the electric field for poling in order to produce the optical semiconductor hybrid element shown in FIG. 4.

The halogen element has a reduced effect of lowering the electric field required for the orientation of the polarity as compared with the addition of the H element. However, the halogen element is an element having a high electronegativity and can enlarge the nonlinearity (nonlinear optical constant) when the polarity is oriented.

F was used as the halogen element X as described above, but Cl, Br or the like can also be used.

Besides, the nonlinear optical silica film 1 obtained in the aspect 1 preferably has an element ratio of 20 to 35% of Si, 2 to 10% of Ge, 35 to 64% of O and 2 to 40% of the halogen element X such as F. The halogen element X is added in a ratio to fully exhibit the effect of its addition without disturbing the $SiO_2$—$GeO_2$ bond as the base in the same way as the use of H. The Si and Ge elements are also added in a composition ratio to fully exhibit the effect of nonlinearity by Ge· while fully securing the optical transmission factor required for the optical material in the same way as in the aspect 1. Oxygen is preferably added in an amount to configure the Si—O—Si, Si—O—Ge and Ge—O—Ge bonds and desirably in a ratio of the number of elements of $(Si+Ge):\{O\times 2+H\} \approx 1:4$ as a stoichiometrical composition ratio.

To form the nonlinear optical silica film according to the aspect 2, the CVD apparatus can be used in the same way as in the aspect 1. In such a case, a substance containing at least Si and the halogen element, a substance containing at least Ge and the halogen element, $H_2$ and $O_2$ gases may be used as the raw materials. Besides, a substance containing the halogen element can be mixed separately. Thus, the selection of the material gases, the mixing ratio of the material gases, the temperature of the semiconductor substrate, the pressure in the decompression container can be adjusted to form the nonlinear optical film having the various bonds of Si—X, Ge—X and the like as shown in FIG. 4 by the plasma CVD or the like.

EXAMPLE 2

An example of forming the nonlinear optical film according to the aspect 2 by the plasma CVD apparatus shown in FIG. 3 will be described. In Example 2, the decompression container was decompressed after placing the semiconductor substrate 3 therein, and the semiconductor substrate 3 was heated to 50 to 500° C. as required in the same way as in Example 1.

Subsequently, $SiF_4$ gas diluted with halogen gas such as $F_2$ or an inert gas, $GeF_4$ gas diluted with halogen gas such as $F_2$ or an inert gas as required and $F_2$ gas were supplied from the cylinders filled with the combustible gases 19 to the decomposition container 11 through the flow rate adjusters 17 and the valves 16. Meanwhile, $O_2$ gas was supplied from the cylinder filled with $O_2$ gas as the combustion-supporting gas 20 through the flow rate adjuster 17 and the valve 16. In order to prevent combustion in the piping, the $O_2$ gas was mixed with the combustible gases in the mixing section 14 within the fully decompressed container 11.

Subsequently, in the same way as in Example 1, plasma was produced for a predetermined period of time to decompose the material gases $SiF_4$, $GeF_4$, $F_2$ and $O_2$ to form the nonlinear optical silica film 1 according to the aspect 2 and having a thickness of 0.1 to 10 $\mu$m on the surface of the semiconductor substrate 3. Thus, the ratio of the number of elements of the nonlinear optical silica film 1 formed on the substrate 3 was 20 to 35% of Si, 2 to 10% of Ge, 35 to 64% of O, and 2 to 40% of the halogen element such as F (or a total of the halogen element and H if H was contained). Thus, the nonlinear optical silica film 1 is composed of Si—H, Si—F, Ge—H and Ge—F bonds on the basis of the Si—O and Ge—O bonds configuring the network as shown in FIG. 6. Besides, it has Ge·as the non-valence arm. Nonlinearity is then imparted to the silica film 1 by applying an electric field to the silica film 1 in the same way as in Example 1.

[Aspect 3]

In the aspect 3, when the nonlinear optical silica film 1 of the aspect 1 or 2 is formed on the semiconductor substrate 3 as shown in FIG. 4, the insulating film 2 is interposed between the semiconductor substrate 3 and the nonlinear optical silica film 1. This insulating film 2 is formed of, for example, a silicon compound such as silicon oxide (SiOx) or silicon nitride (SiNx) as a typical material. The insulating film has a thickness of 0.1 to 10000 nm, and more preferably 2 to 1000 nm.

The presence of the insulating film 2 as shown in FIG. 4 has the effects of preventing increase of defects on the surface of the semiconductor substrate caused when the nonlinear optical silica film 1 is formed on the surface of the semiconductor substrate 3 and dispersing the Ge element contained in the silica film 1 into the semiconductor substrate. Therefore, the semiconductor layer 5 where transistors, capacitors and the like are formed can be prevented from being broken or degraded in performance.

The insulating film 2 according to the aspect 3 can be formed by a thermal oxidation method or a CVD method. Each method will be described below.

(i) Formation of the Insulating Film by the Thermal Oxidation Method

Figure 7:
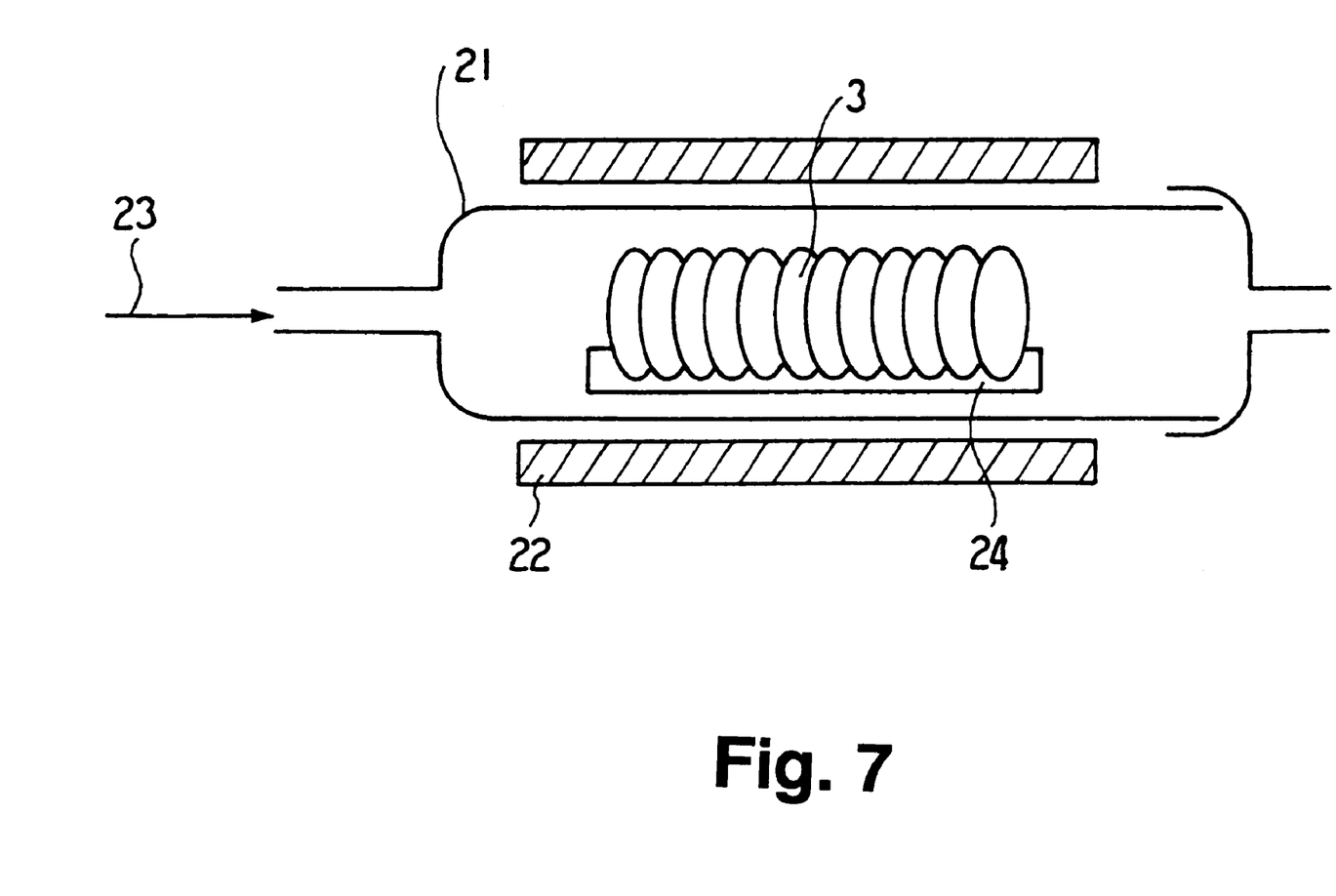
FIG. 7 is a schematic diagram showing a structure of an oxidizing furnace for performing a thermal oxidizing method.

To form the insulating film 2 shown in FIG. 4 on an Si semiconductor substrate, an $SiO_2$ film can be formed by oxidizing the Si surface by thermally oxidizing. The $SiO_2$ film can be formed by the thermal oxidation method in an oxidizing furnace as shown in FIG. 7. First, a sterile quartz tube 21 is heated to 600 to 1200° C. by an annular heater 22. Gas such as O or $H_2$ is supplied as a supply gas 23, and the semiconductor substrates 3 are placed on a quartz board 24, and the quartz board 24 with the semiconductor substrates 3 thereon is placed in the quartz tube 21 as shown in FIG. 7. Subsequently, the semiconductor substrates 3 are heated for about 5 minutes to 120 minutes while causing the aforesaid gas to flow to form the $SiO_2$ film as the insulating film on the surface of the semiconductor substrates 3. Here, HCl gas or the like may be added to improve the cleanness of the interior of the quartz tube 21 and to remove contaminants from the surface of the semiconductor substrates 3. The insulating film ($SiO_2$ film) formed as described above has a thickness of 0.1 to 10000 nm, and preferably 2 to 1000 nm.

The formation of the $SiO_2$ film by the thermal oxidation has an advantage that the insulating film can be formed densely with quite low contamination. Therefore, in the composition as shown in FIG. 4, by using as the insulating film 2 the $SiO_2$ film obtained by the thermal oxidation, the semiconductor substrate 3 and the semiconductor layer 5 can be prevented from being degraded in performance and having its functions damaged due to contaminating impurities, and the performance of the nonlinear optical silica film can be kept intact.

EXAMPLE 3-1

An example of forming the insulating film 2 on the semiconductor substrate 3 by the oxidizing furnace shown in FIG. 7 will be described.

First, the interior of the quartz tube 21 was heated to 900 to 1000° C. by the annular heater 22 disposed around the quartz tube 21 while flowing the supply gas 23 such as $O_2$ into the quartz tube 21 which was kept clean. Here, in order to further improve cleanness of the interior of the quartz tube, it is desirable to remove contaminating impurities within the quartz tube by supplying a mixture gas of, for example, $O_2$ and HCl and keeping it there for 10 to 120 minutes.

Subsequently, the semiconductor substrates 3 having the semiconductor layer 5 formed thereon as shown in FIG. 4 were arranged on the quartz board 24. It is to be noted that the semiconductor substrates 3 were previously cleaned with an alkaline solution, an acid solution, an organic solvent or the like. When the quartz board was inserted into the quartz tube 21, the annular heater 22 was controlled to lower the temperature within the furnace down to 700 to 900° C. so to decrease a change in temperature while inserting the quartz board, and the quartz board 24 was inserted into the quartz tube 21 at a predetermined speed.

After inserting the quartz board 24, the temperature within the quartz tube 21 was raised to 900 to 1000° C. Subsequently, a mixture gas of $O_2$ and HCl was supplied and kept for about 10 minutes to remove a very small amount of contaminating impurities from the surface of the semiconductor substrate while forming the insulating film 2 on the semiconductor substrate 3. The supply gas 23 was changed to a mixture gas of $O_2$ and $H_2$ and kept for about 60 minutes to form the insulating film on the semiconductor substrate.

Thus, the $SiO_2$ film obtained by oxidizing the surface of Si by exposing the surface of Si to an oxidation atmosphere at a high temperature has a thickness of 100 to 500 nm, which can be adjusted by controlling a temperature and a time for forming the film. The obtained $SiO_2$ film has a sufficient thickness to protect the semiconductor substrate 3 and the semiconductor layer 5 and to prevent a mechanical damage and dispersion of contaminating impurities when the nonlinear optical film 1 is formed on the insulating film 2.

Subsequently, as shown in FIG. 4, the nonlinear optical film 1 was formed on the formed $SiO_2$ film by the method as described in the aspects 1 and 2, and the optical semiconductor hybrid element was completed by forming the wiring 4 by using, for example, a conductive metallic material.

(ii) Formation of the Insulating Film by the Vapor Phase Synthesis Method (CVD method)

Now, a method of forming an insulating film by the vapor phase synthesis method, which is another method for forming the insulating film 2, will be described. The CVD method for forming the insulating film 2 can be performed by means of the same CVD apparatus as the one used for forming the nonlinear optical film 1 shown in FIG. 3 by the CVD method.

As shown in FIG. 3, the plasma CVD apparatus with the electric discharge electrodes 12u, 12d disposed in the decompression container 11 into which the raw materials are introduced can be used. The same portions as those described in connection with FIG. 3 will not be described in the following description.

The semiconductor substrate 3 on which the insulating film 2 is to be formed is placed on the upper electric discharge electrode 12u, and the high-frequency power source 13 and the gas mixing section 14 are connected to the lower electric discharge electrode 12d. The material gases are supplied from the cylinders (raw material containers) 18 to the gas mixing section 14 through the flow rate adjusters 17 and the valves 16. As the material containing elements to be constituent elements of the insulating film 2, gas containing at least Si and O (oxygen) elements or at least Si and N elements, such as $SiH_4$, $NH_3$, $H_2$, $O_2$, $N_2O$ and TEOS is introduced in the sealed container 1 with a flow rate adjusted. Subsequently, power is applied from the high-frequency power source 13 with the gas pressure retained at 1 to 1000 Pa to produce plasma for a predetermined period of time so to decompose the gas for a predetermined time, thereby forming the insulating film 2 on the surface of the raw semiconductor substrate 3. Means for decomposing the raw materials can be a high-frequency electric discharge, a DC electric discharge, optical energy such as an ultraviolet ray electric discharge, a chemical reaction or a high temperature.

Thus, to form the insulating film 2 by the vapor phase synthesis method (plasma CVD method), the selection of the material gases and the adjustment of a mixing ratio of the material gases, a temperature of the semiconductor substrate and a pressure in the decompression container may be effected as desired. Also, the insulating film 2 can be formed at a relatively low temperature by using the vapor phase synthesis method, and particularly the plasma CVD method. By being structured as shown in FIG. 4, the semiconductor substrate 3 and the semiconductor layer 5 can be prevented from being degraded or damaged in performance when they are directed to the thermal treatment.

When the insulating film 2 is formed by the CVD method as described above, the insulating film 2 and the nonlinear optical silica film 1 can be formed successively in the same CVD apparatus by changing the supply gas, and the production cost of the device can be lowered.

EXAMPLE 3-2

Now, an example of forming the insulating film 2 on the semiconductor substrate 3 as shown in FIG. 4 by the vapor phase synthesis method (plasma CVD method) will be described.

First, the semiconductor substrate 3 having the semiconductor layer 5 formed thereon was placed on the upper electrode 12$u$ within the decompression container 11. Generally, the upper electrode is connected grounded, and the lower electrode is connected to the high-frequency power source 13. Subsequently, the sealed container 11 was decompressed to about $10^{-3}$ to $10^{-4}$ Pa by the pump 15. If necessary, the semiconductor substrate 3 is heated to about 50 to 500° C. by a heater built into the upper electrode 12$u$ or the like.

$SiH_4$ gas, $NH_3$ gas and $N_2$ gas, which were diluted with $H_2$ or an inert gas as required, were supplied from respective cylinders filled with the combustible gases 19 into the decompression container 11 through the flow rate adjusters 17 and the valves 16.

The pressure in the decompression container 11 was kept at about 10 to 100 Pa by an adjuster, and power with a frequency of 13.53 MHz was applied from the power source 13 to produce plasma for a predetermined period of time so to decompose the material gases $SiH_4$, $NH_3$ and $N_2$, thereby forming the insulating film with a thickness of 100 to 500 nm on the surface of the semiconductor substrate 3. The insulating film 2 formed on the surface of the substrate 3 was an SiNx film containing H elements. The SiNx film protects the semiconductor substrate 3 and the semiconductor layer 5, and when the nonlinear optical silica film 1 as in the aspects 1 and 2 is formed on the insulating film 2, it has a thickness sufficient to prevent impurities which contaminate the substrate 3 or the semiconductor 5 from dispersing and to prevent them from being mechanically damaged.

As means for decomposing the material gases, the high-frequency power source of 13.56 MHz was used in Example 3-2, but it is not exclusive and it can be of a frequency of 1 KHz to 10 GHz. In addition to the high-frequency power source, a DC electric discharge, light energy such as ultraviolet rays, a chemical reaction, a high temperature (heat) or the like can be used to decompose the material gases.

Subsequently, the nonlinear optical silica film 1 as shown in the aspect 1 or 2 was formed on the insulating film 2, and the wiring 4 was formed to obtain the optical semiconductor hybrid element as shown in FIG. 4.

While there have been described that what are at present considered to be preferred embodiments of the invention, it is to be understood that various modifications may be made thereto, and it is intended that the appended claims cover all such modifications as fall within the true spirit and scope of the invention.

What is claimed is:

1. A nonlinear optical silica material comprising $SiO_2$—$GeO_2$, wherein Ge atoms having a dangling bond in the silica material have two Ge—O bonds and one Ge—H bond.

2. A nonlinear optical silica material comprising $SiO_2$—$Geo_2$, wherein Ge atoms having a dangling bond in the silica material have two Ge—O bonds and one Ge-halogen bond.

3. A nonlinear optical device having a nonlinear optical silica material film mainly consisting of $SiO_2$—$GeO_2$ formed on a substrate, wherein the nonlinear optical silica material film contains either or both of hydrogen or a halogen element therein, and an insulating film is formed between the nonlinear optical silica material film and the substrate, and, wherein the nonlinear optical silica film comprises Ge atoms having a dangling bond in the silica material with two Ge—O bonds and one Ge—H bond.

4. A nonlinear optical device having a nonlinear optical silica material film mainly consisting of $SiO_2$—$GeO_2$ formed on a substrate, wherein the nonlinear optical silica material film contains either or both of hydrogen or a halogen element therein, and an insulating film is formed between the nonlinear optical silica material film and the substrate, and, wherein the nonlinear optical silica film comprises Ge atoms having a dangling bond in the silica material with two Ge—O bonds and one Ge-halogen bond.

5. A nonlinear optical device according to claim 4, wherein the insulating film comprises a silica compound.

6. A nonlinear optical device according to claim 4, wherein the insulating film has a thickness of about 0.1 nm to 10,000 nm.

7. A nonlinear optical device according to claim 4, wherein the substrate comprises a silicon semiconductor having a semiconductor element formed therein.

* * * * *